(12) United States Patent
Zhang et al.

(10) Patent No.: US 11,333,575 B2
(45) Date of Patent: May 17, 2022

(54) METHOD FOR FAULT DIAGNOSIS OF AN AERO-ENGINE ROLLING BEARING BASED ON RANDOM FOREST OF POWER SPECTRUM ENTROPY

(71) Applicant: DALIAN UNIVERSITY OF TECHNOLOGY, Liaoning (CN)

(72) Inventors: Shuo Zhang, Liaoning (CN); Jibang Li, Liaoning (CN); Ximing Sun, Liaoning (CN); Tao Sun, Liaoning (CN)

(73) Assignee: DALIAN UNIVERSITY OF TECHNOLOGY, Liaoning (CN)

( * ) Notice: Subject to any disclaimer, the term of this patent is extended or adjusted under 35 U.S.C. 154(b) by 303 days.

(21) Appl. No.: 16/629,423

(22) PCT Filed: Mar. 1, 2018

(86) PCT No.: PCT/CN2018/077739
§ 371 (c)(1),
(2) Date: Jan. 8, 2020

(87) PCT Pub. No.: WO2019/153388
PCT Pub. Date: Aug. 15, 2019

(65) Prior Publication Data
US 2020/0200648 A1    Jun. 25, 2020

(30) Foreign Application Priority Data

Feb. 12, 2018    (CN) .......................... 201810144056.2

(51) Int. Cl.
*G01M 13/045*    (2019.01)
*G06K 9/62*    (2022.01)
(Continued)

(52) U.S. Cl.
CPC ....... *G01M 13/045* (2013.01); *G06K 9/00516* (2013.01); *G06K 9/6232* (2013.01); *G06K 9/6256* (2013.01); *G06K 9/6282* (2013.01); *G06N 20/20* (2019.01); *G06F 17/148* (2013.01); *G06K 9/00523* (2013.01); *G06K 9/00536* (2013.01)

(58) Field of Classification Search
CPC . G01M 13/045; G06K 9/6232; G06K 9/6256; G06K 9/6282; G06K 9/00523;
(Continued)

(56) References Cited

U.S. PATENT DOCUMENTS 8,155,820 B2    4/2012    Eklund et al.
10,168,248 B1 *   1/2019    Morey ............... G01M 13/045

FOREIGN PATENT DOCUMENTS

CN    103471849 A    12/2013
CN    104122086 A *   10/2014
(Continued)

OTHER PUBLICATIONS

Shi et al., "Condition Monitoring and Fault Diagnosis of Rolling Element Bearings Based on Wavelet Energy Entropy and SOM" 2012 IEEE (Year: 2012).*

(Continued)

*Primary Examiner* — John C Kuan
(74) *Attorney, Agent, or Firm* — Muncy, Geissler, Olds & Lowe, PC

(57) ABSTRACT

The present invention belongs to the technical field of fault diagnosis of aero-engines, and provides a method for fault diagnosis of an aero-engine rolling bearing based on random forest of power spectrum entropy. Aiming at the above-mentioned defects existing in the prior art, a method for fault diagnosis of an aero-engine rolling bearing based on random forest is provided, wherein test measured data for an aero-engine rolling bearing provided by a research institute are used for establishing a training dataset and a test dataset first; and based on an idea of fault feature extraction, time domain (Continued)

statistical analysis and frequency domain analysis are conducted on original collection data by adopting wavelet analysis; thereby realizing effective fault diagnosis from the perspective of engineering application.

1 Claim, 2 Drawing Sheets

(51) Int. Cl.
  *G06N 20/20* (2019.01)
  *G06F 17/14* (2006.01)
  *G06K 9/00* (2022.01)
(58) Field of Classification Search
  CPC ... G06K 9/00536; G06N 20/20; G06F 17/148
  See application file for complete search history.

(56) References Cited

FOREIGN PATENT DOCUMENTS

| | | | | |
|---|---|---|---|---|
| CN | 105547698 | A | * | 5/2016 |
| CN | 105760839 | A | * | 7/2016 |
| CN | 106323635 | A | * | 1/2017 |
| CN | 106769049 | A | * | 5/2017 |
| CN | 107036816 | A | | 8/2017 |
| CN | 107255492 | A | | 10/2017 |
| CN | 107643180 | A | | 1/2018 |
| CN | 107657088 | A | * | 2/2018 |
| KR | 20070105288 | A | | 10/2007 |

OTHER PUBLICATIONS

Ferenc et al., "A Proposed Approach to the Classification of Bearing Condition Using Wavelets and Random Forests" 2nd Mediterranean Conference on Embedded Computing, MECD—2013 (Year: 2013).*

Qin et al., "The Fault Diagnosis of Rolling Bearing Based on Ensemble Empirical Mode Decomposition and Random Forest" Hindawi, Shock and Vibration, vol. 2017, Article ID 2623081 (Year: 2017).*

Li et al., "ECG Classification Using Wavelet Packet Entropy and Random Forests" Entropy 2016 (Year: 2016).*

Biau et al., "A random forest guided tour" TEST (2016) 25:197-227 (Year: 2016).*

* cited by examiner

METHOD FOR FAULT DIAGNOSIS OF AN AERO-ENGINE ROLLING BEARING BASED ON RANDOM FOREST OF POWER SPECTRUM ENTROPY

TECHNICAL FIELD

The present invention belongs to the technical field of fault diagnosis of aero-engines, and particularly relates to a method for fault diagnosis of an aero-engine rolling bearing based on random forest of power spectrum entropy.

BACKGROUND

As an aero-engine is the only part of an aero-engine system, whether the an aero-engine can work normally directly affects the flight safety of the aircraft. The rolling bearing is one of the most widely used general mechanical components in the application of the aero-engine, and the study indicates that the rolling bearing fault has a considerable proportion in various faults of the aero-engine. Therefore, how to accurately monitor and identify different fault modes of the aero-engine rolling bearing plays a key role in ensuring the flight safety of the aircraft and reducing the maintenance costs, and has important military and economic value.

At present, many domestic and foreign scholars have carried out the work on the detection and diagnosis of the rolling bearing, and the frequently-used diagnosis technologies comprise thermal diagnosis, acoustic diagnosis, optical fiber diagnosis, fluid diagnosis and vibration diagnosis technology, wherein the theory of the vibration diagnosis technology is relatively mature, the deformation, falling-off and other conditions of the rolling bearing are monitored and diagnosed by collecting and processing the vibration signals in an operational process. The technology adopted herein is a vibration diagnosis technology.

To sum up, the present invention proposes a fault diagnosis model of an aero-engine rolling bearing based on random forest of power spectrum entropy, and identifies 10 kinds of states such as inner race fault and outer race fault of a engine rolling bearing and rolling elements fault from the point of view of practical engineering application.

SUMMARY

Aiming at the above-mentioned defects existing in the prior art, the present invention provides a method for fault diagnosis of an aero-engine rolling bearing based on random forest.

The technical solution of the present invention is:

A method for fault diagnosis of an aero-engine rolling bearing based on random forest of power spectrum entropy, as shown in a main flow chart in FIG. 1, comprising the following steps:

Step 1: Preprocessing on Aero-Engine Rolling Bearing Fault Data first conducting preprocessing in steps (1) and (2) on the original rolling bearing data:

(1) rolling bearing experimental measured data comprise eight groups of parameters: rotational speed $n_1$, vibration acceleration of driven end $a_1$, vibration acceleration of fan end $a_2$, fault diameter d, number of balls Z, inner radius $r_1$, outer radius $r_2$ and contact angle $\alpha_2$.

(2) data integration: the rolling bearing experimental measured data comprise data collected at multiple experiment sites. Combining and storing the multi-source experimental data, and establishing a rolling bearing fault database:

after the fault features are to be extracted, conducting processing in steps (3), (4) and (5) on the feature data:

(3) resampling: analyzing the feature data. Because sampling time intervals are different, a linear resampling method is adopted to resample the rolling bearing experimental measured data for the convenience of subsequent rolling prediction;

(4) normalization: conducting normalization processing on the resampled data in order to eliminate the order of magnitude difference between the data of each dimension and avoid a large prediction error caused by the order of magnitude difference between input and output data; using Min-Max scaling, the conversion form thereof is as follows:

$$x_{nor} = (x_{nor} - x_{min})/(x_{max} - x_{min})$$

where, $x_{nor}$ is the data series to be normalized, $x_{min}$ is the minimum number in the data series, and $x_{max}$ is the maximum number in the data series;

(5) data filtering and cleaning: conducting visualization processing on the normalized data, and conducting simple clustering and cleaning on fault data;

Step 2: Extracting Feature Vector of Rolling Bearing Data processing the collected rolling bearing experimental measured data as feature vector to characterize conditions of vibration fault features. The feature vector comprises time-domain parameters and power spectrum entropy;

(1) Time-Domain Parameters

The change of time-domain parameters of a vibration signal often reflects the change of an operating condition of a device, and some time-domain parameters of the signal are used as feature parameters; the time-domain feature parameters during vibration are divided into dimensional parameters and dimensionless parameters, and the collected vibration data are set as $(X_t)_{t=1}^N$, where N is experimental observation time;

wherein the dimensional time-domain vibration parameters are as follows:

Mean value:

$$\overline{X} = \frac{1}{N}\sum_{t=1}^{N}|X_t|$$

Variance:

$$S^2 = \frac{1}{N}\sum_{t=1}^{N}(X_t - \overline{X})^2$$

Root mean square value:

$$X_{RMS} = \sqrt{\frac{1}{N}\sum_{t=1}^{N}X_t^2}$$

Peak value:

$$X_P = \max(|X_t|)$$

wherein the dimensionless time domain vibration parameters are as follows:

Crest Factor:
$$C_f = \frac{X_p}{X_{RMS}}$$

Skewness Index:
$$X_{SKE} = \frac{\frac{1}{N}\sum_{t=1}^{N}(X_t - \overline{X})^3}{\sqrt{S^2}^{\,2}}$$

Kurtosis Value:
$$X_{KUR} = \frac{\frac{1}{N}\sum_{t=1}^{N}(X_t - \overline{X})^4}{\sqrt{S^2}^{\,4}}$$

Impulse Factor:
$$1 = \frac{X_p}{\overline{X}}$$

Shape Factor:
$$X_{SHA} = \frac{X_{RMS}}{\overline{X}}$$

Clearance Factor:
$$X_{CLE} = \frac{X_p}{\left(\frac{1}{N}\sum_{t=1}^{N}\sqrt{|X_t|}\right)^2}$$

where N is experimental observation, that is, original channel length;

(2) Power Spectrum Entropy decomposing and reconstructing the vibration signal by a wavelet toolbox in MATLAB, and before decomposing and reconstructing, first selecting and determining wavelet basis function, wavelet order and wavelet packet decomposition level, wherein the wavelet basis function selects Db wavelet, the wavelet order selects 1 and wavelet packet decomposition level selects 3;

after orthogonal decomposition of wavelet packets, because the signals of each frequency band obtained by measuring the vibration signal are relatively independent, the energy of each frequency band obtained by the wavelet packet can be monitored, and all components of the signal comprising harmonic components are monitored;

a calculation formula of the components of the signal is:

$$E_{ij} = \int |S_{ij}(t)|^2 dt = \left(\sum_{k=1}^{n}|x_{ij}(m)|^2\right)^{\frac{1}{2}}$$

where, $E_{ij}$ is energy, $S_{ij}(t)$ is reconstruction signal, i is the layers of wavelet decomposition, and j is a node of the ith layer, $j=1, \ldots, 2^i$; $m=1, 2, \ldots, n$. $n \in Z$, n is the number of discrete points of the reconstruction signal;

second, calculating power spectrum entropy; power spectrum is the change of signal with limited power in the unit frequency band with frequency; after the jth layer wavelet packet decomposition is conducted on the signal, a wavelet packet decomposition sequence S(j, m) is obtained, where m takes $0 \sim 2^j - 1$, and the wavelet decomposition of the signal herein is regarded as a division, and the measure of the division is defined:

$$P_{(j,m)}(i) = S_{F(j,m)}(i) \Big/ \sum_{i=1}^{N} S_{F(j,m)}(i)$$

where, $S_{F(j,m)}(i)$ is the ith value of Fourier transform sequence of S(j, m), and N is original channel length:

based on the basic theory of information entropy, the power spectrum entropy on wavelet packet space is defined at the same time:

$$H(j, m) = -\sum_{i=1}^{n} P_{(j,m)}(i) \log P_{(j,m)}(i)$$

based on analysis, 11 parameters such as the time-domain parameters (mean value, variance, root mean square value, peak value, crest factor, skewness index, kurtosis value, impulse factor, shape factor and clearance factor) and power spectrum entropy are selected as input attribute in a random forest method of feature parameters. The analysis for time domain extracted in the fault features is shown in FIG. 1, and the computational analysis for the power spectrum entropy is shown in FIG. 2.

Step 3: Establishing a Training Database

The sample size of the r category of fault is set as G(r), and the set of samples after sparse representation are {X(1), X(2) . . . (X(G(r))}, wherein X(h)=($x_h(1)$, $x_h${2} . . . $x_h$(dim),} multidimensional feature vector corresponding to each sample;

{y(1), y(2) . . . y(G(r))} is set as the corresponding multi-category fault label, and the random forest model inputs are {X(h)} and outputs are {y(h)}:

Step 4: Building a Rolling Bearing Vibration Fault Classification Model Based on Random Forest The random forest is a combinatorial algorithm based on the classification tree and is proposed by Breiman in 2001. The random forest has been applied in many fields because the random forest has less parameter adjustment without worrying about overfitting and has the characteristics such as better anti-interference to noise. The implementation principle thereof is as follows:

There are two important parameters of random forest, respectively: ntree, that is, the number of generated decision trees; and mtry, that is, the feature number of regression trees;

the training steps of the random forest model are as follows:

1) first giving a training set Train, a test set Test and the dimensions of feature F, and determining the number of decision trees ntree, depth of each tree and the feature number of regression trees mtry;

2) for the ith tree, (i=1: ntree), extracting a training set Train(i) with the same size as Train in a returnable way from Train as a sample of a root node:

3) if reaching an end condition on a current node, that is, the minimum number of samples s on the node and the minimum information gain m on the node, setting the current node as a leaf node and continuing to train other nodes in sequence;

3) if not reaching an end condition on the current node, randomly selecting miry dimensional feature fmtry<<F from F dimensional feature; and using the mtry dimensional feature, seeking one-dimensional feature m that the classification effect is best and threshold thereof, and continuing to train other nodes;

4) repeating the steps 2) and 3) until all nodes are trained or labeled as leaf nodes;

5) repeating the steps 2), 3) and 4) until all decision trees are trained;

6) for the sample in the test set Test, from a root node, according to the threshold of the current node, judging whether to enter the left node or right node until a certain leaf node is reached, and outputting classification labels:

7) according to test centralized data, conducting statistics on the accuracy rate of classification, and evaluating the classification effect of the model (the effect is shown in Table 2).

The present invention has the following beneficial effects that: in the method of the present invention, test measured data for an aero-engine rolling bearing provided by a research institute is used for establishing a training dataset and a test dataset first; and based on an extraction idea of fault features, time domain statistical analysis and frequency domain analysis are conducted on original collection data by adopting wavelet analysis; thereby realizing effective fault diagnosis from the perspective of engineering application.

DETAILED DESCRIPTION

Specific embodiments of the present invention are further described below in combination with accompanying drawings and the technical solution.

The data used in the method are 320 groups of test data of rolling bearing provided by a research institute.

Step 1: Preprocessing on Aero-Engine Rolling Bearing Fault Data (1) rolling bearing original data comprise eight groups of parameters: rotational speed $n_1$, vibration acceleration of driven end $a_1$, vibration acceleration of fan end $a_2$, fault diameter d, number of balls Z, inner radius $r_1$, outer radius $r_2$ and contact angle $\alpha_2$;

(2) data integration: the rolling bearing experimental data comprise data collected at multiple experiment sites. A rolling bearing fault warehouse is established;

after the fault features are to be extracted, conducting processing in steps (3), (4) and (5) on the feature data:

(3) resampling: analyzing the data. Because sampling time intervals are different, a linear resampling method is used to resample the aero-engine performance parameter data for the convenience of subsequent rolling prediction:

(4) normalization: conducting normalization processing on the resampled data and converting the data into data within a certain range in order to eliminate the order of magnitude difference between data of each dimension and avoid a large prediction error caused by the order of magnitude difference between input and output data: and using Min-Max scaling.

(5) data filtering and cleaning: conducting simple clustering and cleaning on fault data:

step 2: Extracting Feature Vector of Rolling Bearing Data processing the collected bearing vibration data as feature vector to characterize conditions of vibration fault features. The feature vector mainly comprises time-domain parameters and power spectrum entropy.

(1) Time-Domain Parameter

The change of time-domain parameters of vibration signal often reflects the change of working state of the equipment, and some time-domain parameters of the signal are used as feature parameters. The time-domain feature parameters during vibration are usually divided into dimensional parameters and dimensionless parameters.

(2) Power Spectrum Entropy

Decomposing and reconstructing are conducted on the vibration signal by a wavelet toolbox in MATLAB. Before decomposing and reconstructing, the suitable wavelet basis function, wavelet order and wavelet packet decomposition level are first selected, wherein the wavelet basis function selects Db wavelet, the wavelet order selects 1 and wavelet packet decomposition level selects 3;

Based on the basic theory of information entropy, the power spectrum entropy on wavelet packet space is defined and calculated at the same time.

Figure 1:
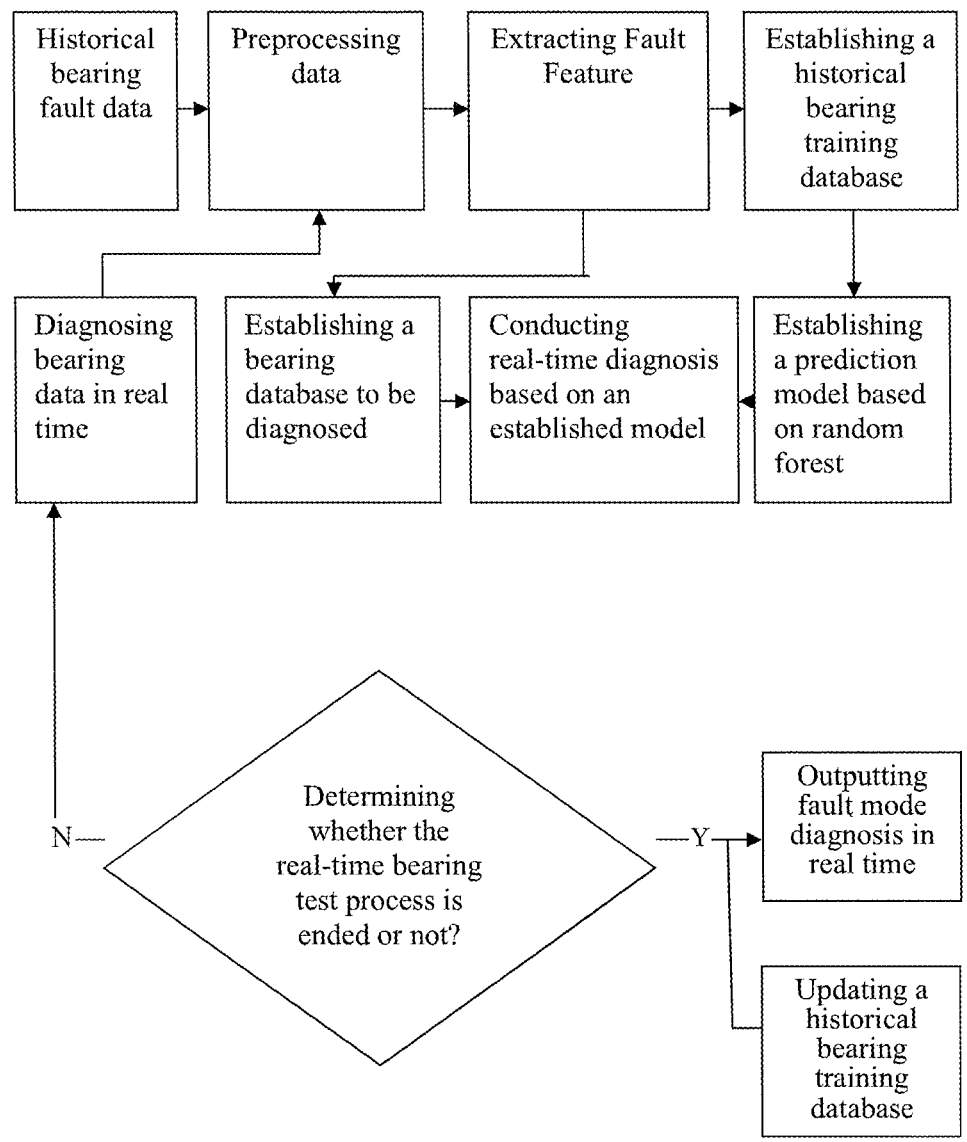
FIG. 1 is a flow chart of establishing a method for fault diagnosis of an aero-engine rolling bearing.
Figure 2:
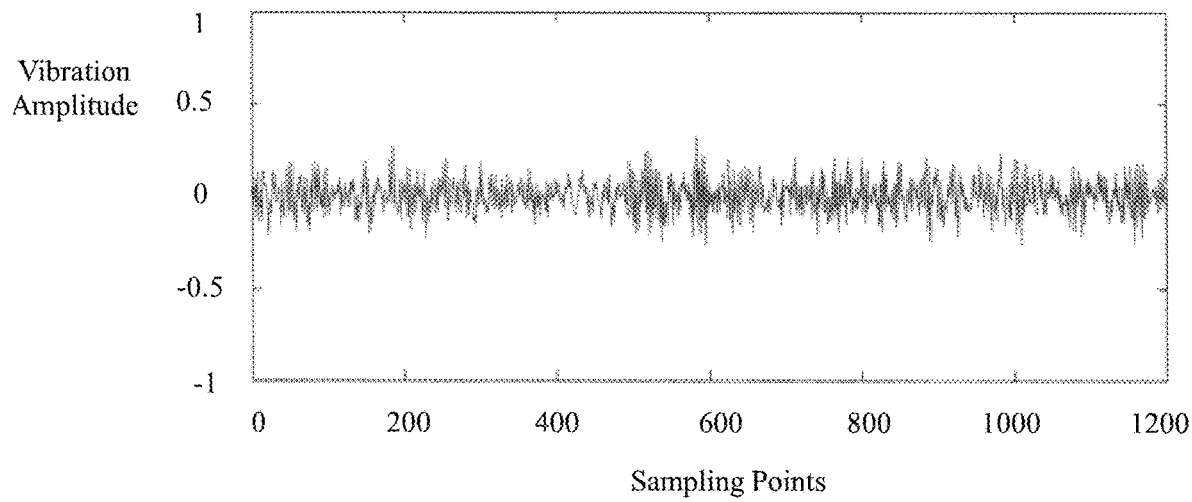
FIG. 2 is a display diagram of time domain vibration signal of a rolling bearing.
Figure 3:
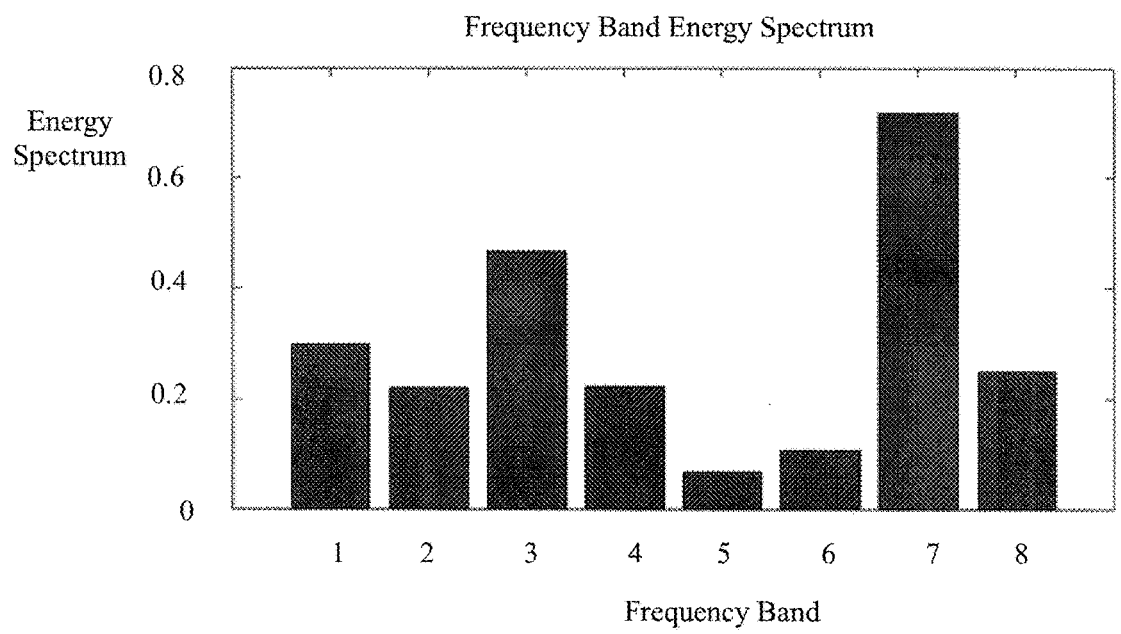
FIG. 3 is a display diagram of analysis results of power spectrum entropy (frequency band energy spectrum).

To sum up, based on analysis, 11 parameters such as the time-domain parameters (mean value, variance, root mean square value, peak value, crest factor, skewness index, kurtosis value, impulse factor, shape factor and clearance factor) and power spectrum entropy are selected as input attribute in a random forest method of feature parameters. The extraction of feature parameters is shown in Table 1 (the fault extraction results of 10 samples are taken). The computational analysis for the power spectrum entropy is shown in FIG. 2.

TABLE 1

Feature Parameter Extraction (Time-domain Parameter and Power Spectrum Entropy)

| Mean value | Variance | RMS | Peak value | Crest Factor | Skewness Index | Kurtosis Value | Impulse Factor | Shape factor | Clearance Factor | Energy Spectrum Entropy |
|---|---|---|---|---|---|---|---|---|---|---|
| 61.2789 | 4.50E+06 | 2.1938 | 0.2061 | 0.094 | −0.0289 | 8.33E−04 | 0.0034 | 0.0358 | 3.29E−06 | 1.5176 |
| 334.9924 | 1.35E+08 | 20.8191 | 5.2024 | 0.2499 | −0.0289 | 8.33E−04 | 0.0155 | 0.0621 | 2.04E−05 | 1.6545 |
| 319.8547 | 1.23E+08 | 18.5822 | 4.5145 | 0.2429 | −0.0289 | 8.33E−04 | 0.0141 | 0.0581 | 1.76E−05 | 1.5884 |
| 304.4911 | 1.11E+08 | 17.3633 | 3.1545 | 0.1817 | −0.0289 | 8.33E−04 | 0.0104 | 0.057 | 1.32E−05 | 1.7279 |
| 474.1136 | 2.70E+08 | 22.2932 | 3.2394 | 0.1453 | −0.0289 | 8.33E−04 | 0.0068 | 0.047 | 7.99E−06 | 1.3964 |
| 431.0915 | 2.23E+08 | 20.1841 | 2.6692 | 0.1322 | −0.0289 | 8.33E−04 | 0.0062 | 0.0468 | 7.19E−06 | 1.4035 |
| 365.4315 | 1.60E+08 | 23.2048 | 5.6954 | 0.2454 | −0.0289 | 8.33E−04 | 0.0156 | 0.0635 | 2.08E−05 | 1.6565 |
| 112.5617 | 1.52E+07 | 4.4339 | 0.7173 | 0.1618 | −0.0289 | 8.33E−04 | 0.0064 | 0.0394 | 6.46E−06 | 1.8967 |
| 128.653 | 1.99E+07 | 5.6969 | 0.9463 | 0.1661 | −0.0289 | 8.33E−04 | 0.0074 | 0.0443 | 7.92E−06 | 1.489 |
| 426.9896 | 2.19E+08 | 19.8143 | 3.0444 | 0.1536 | −0.0289 | 8.33E−04 | 0.0071 | 0.0464 | 8.10E−06 | 1.4184 |

Step 3: Establishing a Training Database

There are 320 groups of data in this experiment. According to the extracted feature vector with 11 dimensions, wherein the number of dimensions of the input data is 11. The output data are the corresponding fault types, and there are 10 categories of faults in total. In the 320 groups of data, the 200 groups of training data are selected, and the remaining 120 groups are used for test data.

Step 4: Building a Rolling Bearing Vibration Fault Classification Model Based on Random Forest There are two important parameters of random forest, that is ntree and mtry, wherein ntree is the number of generated decision trees, and mtry is the number of features of the regression tree:

the training steps of the random forest model are as follows:

(1) first giving a training set Train, a test set Test and the dimensions of feature F, and determining the number of decision trees ntree, depth of each tree and the feature number of regression trees mtry;

(2) for the ith tree (i=1: ntree), extracting a training set Train(i) with the same size as Train in a returnable way from Train as a sample of a root node;

(3) determining the corresponding threshold and other factors for the current node according to the condition whether the current node has reached the termination condition.

(4) repeating the above steps until all the decision trees are trained, thereby establishing a diagnostic model.

(6) for the sample in the test set Test, starting at a root node, according to the threshold of the current node, judging whether to enter the left node or right node until a certain leaf node is reached, and outputting classification labels;

(7) conducting statistics on the accuracy rate of classification. The classification effects of the 10 categories of faults are shown in Table 2.

TABLE 2

Classification Effect Statistics of Each Fault Type of Rolling Bearing Based on Random Forest Model

| Fault Type | Test Samples (piece) | Correctly Classified Samples (piece) | Classification Accuracy Rate (%) |
|---|---|---|---|
| Normal | 12 | 11 | 91.7 |
| inner ring fault diameter 0.07 inch | 12 | 12 | 100 |
| inner ring fault diameter 0.14 inch | 12 | 11 | 91.7 |
| inner ring fault diameter 0.21 inch | 12 | 12 | 100 |
| outer ring fault diameter 0.07 inch | 12 | 12 | 100 |
| outer ring fault diameter 0.14 inch | 12 | 12 | 100 |
| outer ring fault diameter 0.21 inch | 12 | 12 | 100 |
| ball fault diameter 0.07 inch | 12 | 12 | 100 |
| ball fault diameter 0.14 inch | 12 | 11 | 91.7 |
| ball fault diameter 0.21 inch | 12 | 12 | 100 |
| Total | 120 | 117 | 97.5 |

It can be known from the statistical results in above Table that the random forest fault diagnosis model has higher fault classification effects, the fault diagnosis rate reaches 97.5%, and at the same time the experimental results also explain the favorable effect that the time domain factor and power spectrum entropy are used as fault features to characterize an original sensor signal. To sum up, a method for fault diagnosis of an aero-engine rolling bearing based on the random forest of power spectrum entropy proposed herein reaches a better application effect.

The invention claimed is:

1. A method for fault diagnosis of an aero-engine rolling bearing based on random forest of power spectrum entropy, comprising the following steps:

step 1: preprocessing aero-engine rolling bearing fault data, comprising:

(1) preprocessing rolling bearing experimental measured data comprising eight groups of parameters: rotational speed $n_1$, vibration acceleration of driven end $a_1$, vibration acceleration of fan end $a_2$, fault diameter d, number of balls Z, inner radius $r_1$, outer radius $r_2$ and contact angle $\alpha_2$;

(2) combining and storing the rolling bearing experimental measured data collected at multiple experiment sites to establish a rolling bearing fault database;

(3) analyzing feature data extracted from the rolling bearing fault database and adopting a linear resampling method to resample the feature data;

(4) normalizing the resampled data in order to eliminate an order of magnitude difference between data of different dimensions and avoid a large prediction error caused by the order of magnitude difference between input and output data, by using Min-Max scaling defined as follows:

normalized $X_{nor}=(X_{nor}-X_{min})/(X_{max}-X_{min})$, where, $X_{nor}$ is a data series to be normalized, $X_{min}$ is a minimum number in the data series, and $X_{max}$ is a maximum number in the data series; and (5) conducting visualization processing on the normalized data, and conducting simple clustering and cleaning on the normalized data;

step 2: extracting a feature vector of rolling bearing data by processing the clustered and cleaned data to generate the feature vector to characterize conditions of vibration fault features, the feature vector comprising time-domain parameters and power spectrum entropy defined as:

(1) the time-domain feature parameters of a vibration signal comprising dimensional time-domain vibration parameters and dimensionless time-domain vibration parameters, wherein data of the vibration signal are set as $\{X_t\}_{t=1}^{N}$, and N is experimental observation time, and wherein the dimensional time-domain vibration parameters are defined as follows:

mean value:

$$\bar{X} = \frac{1}{N}\sum_{t=1}^{N}|X_t|,$$

variance:

$$S^2 = \frac{1}{N}\sum_{t=1}^{N}(X_t - \bar{X})^2,$$

root mean square value:

$$X_{RMS} = \sqrt{\frac{1}{N}\sum_{t=1}^{N}X_t^2},$$

-continued peak value:

$$X_p = \max(|X_t|),$$

and
wherein the dimensionless time-domain vibration parameters are defined as follows:

crest factor:

$$C_f = \frac{X_p}{X_{RMS}},$$

skewness index:

$$X_{SKE} = \frac{\frac{1}{N}\sum_{t=1}^{N}(X_t - \overline{X})^3}{\sqrt{S^2}^3},$$

kurtosis value:

$$X_{KUR} = \frac{\frac{1}{N}\sum_{t=1}^{N}(X_t - \overline{X})^4}{\sqrt{S^2}^4},$$

impulse factor:

$$I = \frac{X_p}{\overline{X}},$$

shape factor:

$$X_{SHA} = \frac{X_{RMS}}{\overline{X}},$$

clearance factor:

$$X_{CLE} = \frac{X_p}{\left(\frac{1}{N}\sum_{t=1}^{N}\sqrt{|X_t|}\right)^2},$$

and
wherein N is experimental observation time, that is, original channel length; and
(2) the power spectrum entropy, derived from the following steps:
decomposing and reconstructing the vibration signal by a wavelet toolbox, and before decomposing and reconstructing, selecting and determining a wavelet basis function, a wavelet order and a wavelet packet decomposition level, wherein the wavelet basis function is selected to be a Daubechies wavelet, the wavelet order is selected to be 1, and the wavelet packet decomposition level is selected to be 3;
after orthogonal decomposition of wavelet packets, monitoring energy of a frequency band obtained by each of the wavelet packets, and monitoring all components of the vibration signal that comprises harmonic components, wherein a calculation formula of the components of the vibration signal is:

$$E_{i,j} = \int |S_{ij}(t)|^2 dt = \left(\sum_{k=1}^{n} |x_{ij}(u)|^2\right)^{\frac{1}{2}},$$

where, $E_{ij}$ is energy, $S_{ij}(t)$ is reconstruction signal, i is a number of layers of wavelet decomposition, and j is a node of the ith layer, $j=1, \ldots, 2^i$; $u=1, 2, \ldots, n$, $n \in Z$, and n is a number of discrete points of the reconstruction signal; and
calculating the power spectrum entropy, wherein,
power spectrum is change of signal with limited power in a unit frequency band with frequency;
after the jth layer wavelet packet decomposition is conducted on the signal, a wavelet packet decomposition sequence S(j, m) is obtained, where m takes 0 to $2^j-1$, and
the wavelet decomposition of the signal herein is regarded as a division, and a measure of the division is defined as:

$$P_{(j,m)}(i) = S_{F(j,m)}(i) \bigg/ \sum_{i=1}^{N} S_{F(j,m)}(i),$$

where $S_{F(i,m)}(i)$ is the ith value of Fourier transform sequence of S(j, m); and N is original channel length; and
based on a basic theory of information entropy, the power spectrum entropy on wavelet packet space is defined as:

$$H_{(j,m)} = -\sum_{i=1}^{n} P_{(j,m)}(i) \log P_{(j,m)}(i),$$

wherein, based on analysis, the time-domain parameters and the power spectrum entropy are selected as input attribute in a random forest method of feature parameters; and
step 3: establishing a training database, wherein,
a sample size of an r category of fault is set as G(r), and a set of samples after sparse representation are $\{X(1), X(2) \ldots (X(G(r))\}$, wherein $X(h)=\{x_h(1), x_h(2) \ldots x_h(\dim)\}$ is multidimensional feature vector corresponding to each of the samples in dim dimensions, dim>1; and
$\{y(1), y(2) \ldots y(G(r))\}$ is set as a corresponding multi-category fault label, and inputs of a random forest model are $\{X(h)\}$ and outputs of the random forest model are $\{y(h)\}$; and
step 4: building a rolling bearing vibration fault classification model based on the random forest model using two parameters of random forest, respectively: ntree, that is the number of generated decision trees; and mtry, that is the feature number of regression trees, wherein, the random forest model are trained as follows:
1) first giving a training setTrain, a test set Test and dimensions of feature F, and determining the number of decision trees ntree, depth of each tree depth and the feature number of regression trees mtry;
2) for the ith tree, i=1: ntree, extracting a training set Train with the same size as Train in a returnable way from Train(i) as a sample of a root node;
3) if reaching an end condition on a current node, that is, a minimum number of samples s on the node and a minimum information gain g on the node, setting the current node as a leaf node and continuing to train other nodes in sequence; if not reaching an end condition on the current node, randomly selecting F dimensional feature fmtry from mtry<<F dimensional feature; and using the mtry dimensional feature, seeking one-dimensional feature w that a classification effect is best and a threshold thereof, and continuing to train other nodes;

4) repeating the steps 2) and 3) until all nodes are trained or labeled as leaf nodes;
5) repeating the steps 2), 3) and 4) until all decision trees are trained;
6) for the sample in the test set Test, starting at a root node, according to the threshold of the current node, judging whether to enter the left node or right node until a certain leaf node is reached, and outputting classification labels; and
7) according to test centralized data, conducting statistics on accuracy rate of classification, and evaluating the classification effect of the random forest model.

* * * * *